United States Patent
Matsumoto et al.

(10) Patent No.: US 9,783,388 B2
(45) Date of Patent: Oct. 10, 2017

(54) SPINDLE UNIT

(71) Applicant: OGURA CLUTCH CO., LTD., Gunma (JP)

(72) Inventors: Yoshiyuki Matsumoto, Gunma (JP); Nobuyuki Shutou, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 0 days.

(21) Appl. No.: 14/910,206

(22) PCT Filed: Jul. 30, 2014

(86) PCT No.: PCT/JP2014/070027
§ 371 (c)(1),
(2) Date: Feb. 4, 2016

(87) PCT Pub. No.: WO2015/019910
PCT Pub. Date: Feb. 12, 2015

(65) Prior Publication Data
US 2016/0176673 A1 Jun. 23, 2016

(30) Foreign Application Priority Data
Aug. 7, 2013 (JP) ................................ 2013-163810

(51) Int. Cl.
*B65H 59/04* (2006.01)
*B65H 59/38* (2006.01)
(Continued)

(52) U.S. Cl.
CPC ........... *B65H 59/04* (2013.01); *B65H 59/382* (2013.01); *D03D 49/16* (2013.01); *H02K 7/086* (2013.01);
(Continued)

(58) Field of Classification Search
CPC ...... B65H 59/02; B65H 59/04; B65H 59/043; B65H 59/38; B65H 59/382; B65H 2701/31; D03D 49/16; H02K 49/043; H02K 7/086
See application file for complete search history.

(56) References Cited

U.S. PATENT DOCUMENTS 6,232,686 B1 * 5/2001 Schneider ............ H02K 49/065
188/267

FOREIGN PATENT DOCUMENTS

DE  4334233 A1  4/1995
JP  S60-033553 U  3/1985
(Continued)

OTHER PUBLICATIONS

International Search Report in PCT/JP2014/070027 dated Oct. 14, 2014, with English translation. 6 pages.

*Primary Examiner* — William E Dondero
(74) *Attorney, Agent, or Firm* — Blakely Sokoloff Taylor & Zafman LLP (57) ABSTRACT

This invention includes an annular hysteresis brake (34) having one end fixed to a stationary frame (11), a support shaft (6) extending through a hollow portion of the hysteresis brake (34), and a spindle part (4) rotatably supported by the support shaft (6). The hysteresis brake (34) includes a yoke (36), a cylindrical hysteresis member (46) inserted into an annular space (41) of the yoke (36), and a hub (37) for rotatably supporting the hysteresis member (46). The spindle part (4) is supported by the support shaft (6) such that the spindle part (4) is restricted from moving toward the hysteresis brake (34) by a sleeve (15). The spindle part (4) and hub (37) are coupled with each other so as to rotate together via pins (21). This invention can simplify the structure while preventing damage to the hysteresis brake, (Continued)

thereby reducing the manufacturing cost of a thread-supplying spindle unit.

5 Claims, 3 Drawing Sheets

(51) Int. Cl.
 *H02K 49/04* (2006.01)
 *H02K 7/08* (2006.01)
 *D03D 49/16* (2006.01)
(52) U.S. Cl.
 CPC ....... *H02K 49/043* (2013.01); *B65H 2701/31* (2013.01)

(56) References Cited

FOREIGN PATENT DOCUMENTS

| | | |
|---|---|---|
| JP | H06-284687 A | 10/1994 |
| JP | H10-502518 A | 3/1998 |
| JP | H10-310955 A | 11/1998 |
| JP | 2001-512000 A | 8/2001 |

* cited by examiner

SPINDLE UNIT

TECHNICAL FIELD

The present invention relates to a spindle unit and, more particularly, to a thread-supplying spindle unit for supporting a bobbin around which a thread to be supplied to a loom is wound.

BACKGROUND ART

Conventionally, a creel for supplying a special thread such as a carbon fiber to a loom includes a spindle unit which rotatably supports a bobbin around which the thread is wound. As described in, e.g., patent literature 1, this spindle unit includes a spindle part having a rotatably supported rotating shaft, and a brake part for braking the rotating shaft.

The rotating shaft of the spindle part rotatably supports the bobbin around which the thread is wound. When attaching the bobbin to the rotating shaft of the spindle part, a worker holds the bobbin in his or her hand and inserts a bobbin-attaching rotating shaft into the core of the bobbin. The weight of the bobbin around which the thread is wound is sometimes about 10 kg.

An example of a fixing structure for fixing the bobbin to the rotating shaft of the spindle part is a structure in which an O-ring is interposed between the bobbin and bobbin-attaching rotating shaft.

When the thread is pulled by the loom, the rotating shaft of the spindle part rotates together with the bobbin.

The brake part of the spindle unit is, e.g., a hysteresis brake, and gives tension to the thread pulled out from the bobbin by braking the rotating shaft of the spindle part.

A hysteresis brake disclosed in patent literature 1 has a rotating shaft on which a brake torque acts. The hysteresis brake is mounted on a frame such that the rotating shaft of the hysteresis brake is parallel to the rotating shaft of the bobbin-attaching spindle part. The rotating shafts of the hysteresis brake and spindle part are coupled with each other via a gear and interlocked. Accordingly, the hysteresis brake applies a predetermined brake torque to the rotating shaft of the spindle part to which the bobbin is attached, thereby giving tension to the thread pulled by the loom.

A general hysteresis brake includes an annular yoke with an excitation coil built-in, or a field core, and a cylindrical hysteresis member having a rotating shaft which rotates together around the same axis.

The field core includes an inner circumferential magnetic pole positioned on the inner circumferential side of the field core, and an outer circumferential magnetic pole positioned on the outer circumferential side of the field core. The inner circumferential magnetic pole and outer circumferential magnetic pole form an annular space in the field core.

The cylindrical hysteresis member is inserted into this annular space of the field core.

RELATED ART LITERATURE

Patent Literature

Patent Literature 1: Japanese Patent Laid-Open No. 10-310955

Patent Literature 2: Japanese Patent Laid-Open No. 6-284687

DISCLOSURE OF INVENTION

Problem to be Solved by the Invention

In the spindle unit disclosed in patent literature 1, the rotating shaft of the spindle part to which the bobbin is attached and the rotating shaft of the hysteresis brake are coupled by the gear. Therefore, this spindle unit has the problem that the manufacturing cost is high because the number of parts is large.

This problem of the number of parts can be eliminated to some extent by arranging the spindle part and brake part on the same axis, and attaching the bobbin to the rotating shaft of the hysteresis brake so that the hysteresis brake and bobbin rotate together.

If this arrangement is adopted, however, the time of the work of attaching the bobbin to the spindle part prolongs. This is so because if the bobbin as a heavy load collides against the hysteresis brake, the impact load acts on the hysteresis brake and may damage it, so the work must carefully be performed to prevent the bobbin from colliding against the hysteresis brake.

The present invention has been made to solve the above problem, and has as its object to provide a thread-supplying spindle unit which simplifies the structure while preventing damage to a hysteresis brake, thereby reducing the manufacturing cost.

Means of Solution to the Problem

To achieve this object, a spindle unit according to the present invention includes a support shaft having one end portion fixed to a stationary frame; a hysteresis brake including an annular yoke which has a central hole through which said support shaft extends, the annular yoke being fixed to said stationary frame at one end, and including an inner circumferential magnetic pole and an outer circumferential magnetic pole facing each other with an annular space being interposed therebetween in the other end, and an excitation coil built-in, a cylindrical hysteresis member through which said support shaft extends and which has one end portion inserted into the space of the other end of said yoke, and an annular hub through which said support shaft extends and which rotatably supports said hysteresis member around said support shaft as a rotation center; a spindle part rotatably supported by said support shaft as a rotation center in a portion of said support shaft which is closer to the other end portion than said hysteresis brake, said spindle part being restricted from moving toward said hysteresis brake; a coupling member configured to couple said hub and said spindle part with each other; and a regulating member configured to regulate the movement of said spindle part toward said hysteresis brake.

Effect of the Invention

In the spindle unit according to the present invention, the spindle part for supporting the bobbin and the hysteresis brake are coupled as they are arranged on the same axis. When compared to a case in which a gear is used to couple these members, therefore, the manufacturing cost can be reduced because the number of parts reduces.

In this spindle unit, if the bobbin collides against the spindle part when attaching the bobbin to the spindle part, the impact load is transmitted from the spindle part to the stationary frame via the support shaft. Although the hysteresis brake and spindle part are arranged on the same axis, therefore, no impact load is directly applied to the hysteresis brake when the bobbin is attached.

Accordingly, the present invention can provide a spindle unit which simplifies the structure while preventing damage to a hysteresis brake, thereby reducing the manufacturing cost.

BEST MODE FOR CARRYING OUT THE INVENTION

An embodiment of a thread-supplying spindle unit according to the present invention will be explained in detail below with reference to FIGS. 1 to 3.

Figure 1:
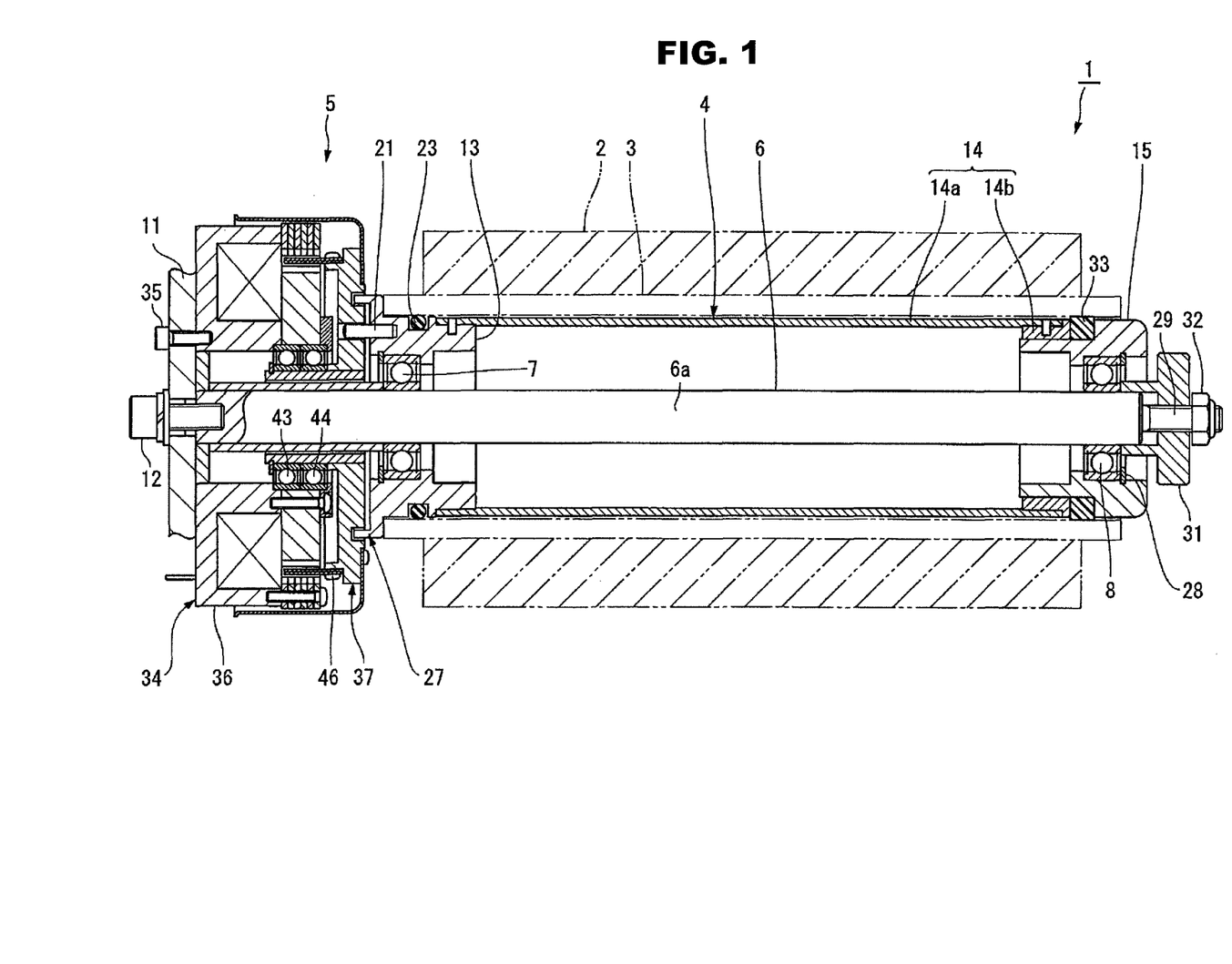
FIG. 1 is a sectional view of a thread-supplying spindle unit according to an embodiment of the present invention.
Figure 2:
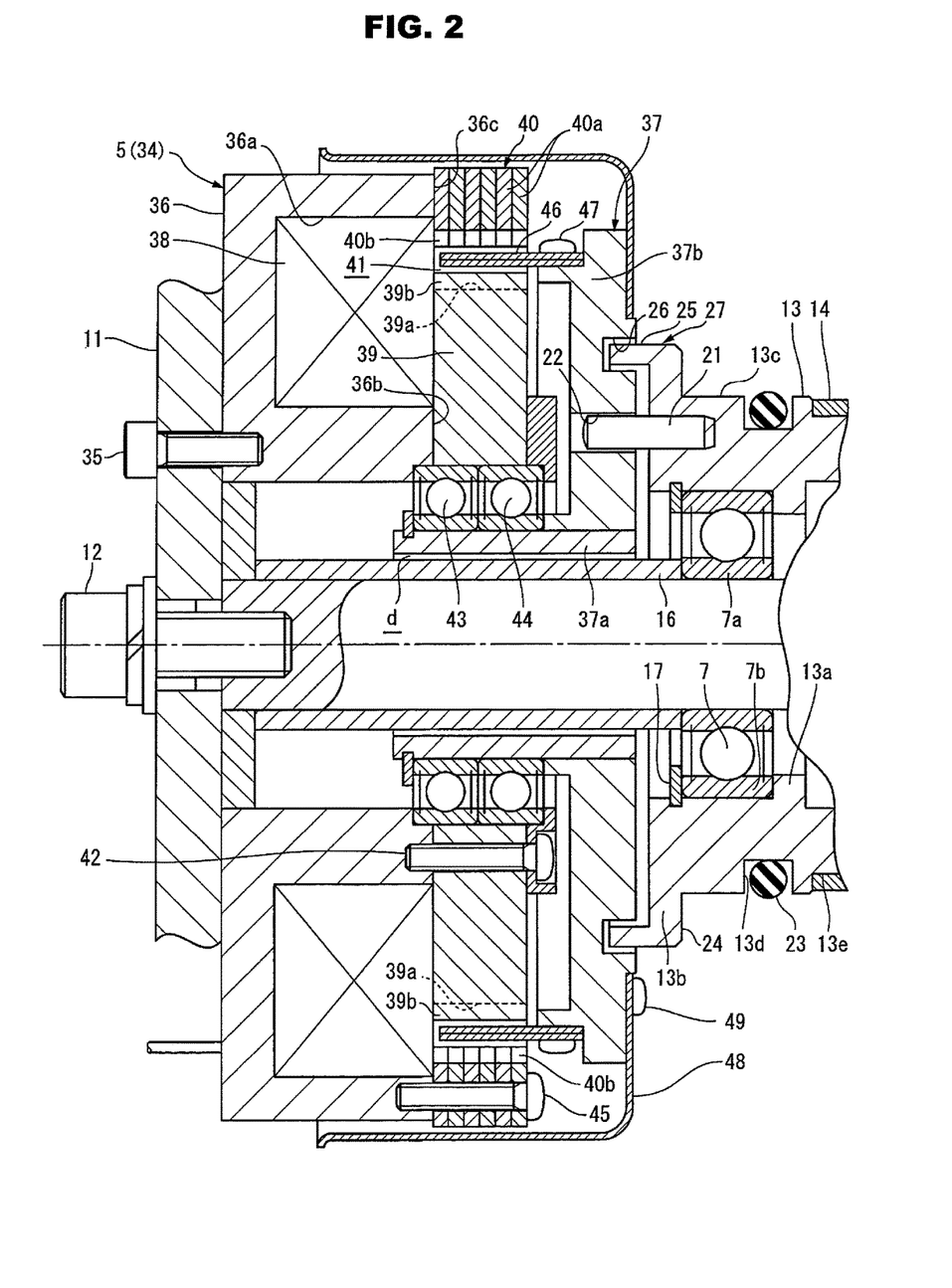
FIG. 2 is a sectional view showing, in an enlarged scale, the proximal end portion of the thread-supplying spindle unit according to the embodiment of the present invention.

A spindle unit 1 shown in FIG. 1 is a thread-supplying spindle unit to be used in a creel (not shown) for pulling out a special thread 2 (to be simply referred to as a thread hereinafter) made of a carbon fiber.

Referring to FIG. 1, a bobbin 3 is formed into a cylindrical shape, and the thread 2 is wound around the outer circumferential portion of the bobbin 3. A spindle part 4 is inserted into the inner circumferential portion of the bobbin 3.

The spindle unit 1 includes a support shaft 6 having one end fixed to a stationary frame 11 of the creel by a fixing bolt 12, the spindle part 4 detachably inserted into the core of the bobbin 3 around which the thread 2 is wound, and a tension applying part 5 connected to one end portion of the spindle part 4. The tension applying part 5 applies tension to the thread 2 pulled out from the bobbin 3. In this embodiment as will be described in detail later, the tension applying part 5 is formed into an annular shape, and one end portion thereof in the axial direction is fixed to the stationary frame. The support shaft 6 extends through the hollow portion of the annular tension applying part 5.

The support shaft 6 is formed to have a length which extends through the spindle part 4 and the hollow portion of the tension applying part 5.

The spindle part 4 is formed into a cylindrical shape, and rotatably supported by the support shaft 6 extending through the core of the spindle part 4 via a proximal-end bearing 7 and distal-end bearing 8. The proximal-end bearing 7 and distal-end bearing 8 of the spindle part 4 are formed on a portion (to be referred to as "a support portion" hereinafter) 6a of the support shaft 6, which projects from the tension applying part 5. As a consequence, the support portion 6a of the support shaft 6 is positioned in the core of the spindle part 4. Also, the spindle part 4 is rotatably supported by the support portion 6a via the bearings 7 and 8 in a state in which the spindle part 4 is positioned on the same axis as that of the support portion 6a.

In this embodiment, the spindle part 4 includes a cylindrical proximal-end pipe member 13 attached to the above-described proximal-end bearing 7 and adjacent to the tension applying part 5, a cylindrical distal-end pipe member 15 attached to the distal-end bearing 8, and a cylindrical member 14 having one end portion connected to the proximal-end pipe member 13 and the other end portion connected to the distal-end pipe member 15.

A sleeve 16 is provided between the proximal-end bearing 7 and stationary frame 11. The sleeve 16 is a cylindrical member. The support shaft 6 extends through the sleeve 16. The sleeve 16 regulates the movement of an inner ring 7a (see FIG. 2) of the proximal-end bearing 7 toward the tension applying part 5.

Also, an outer ring 7b of the proximal-end bearing 7 is sandwiched between a flange 13a formed on the inner circumferential side of the proximal-end pipe member 13 and a circlip 17. Accordingly, the spindle part 4 is rotatably supported by the support shaft 6 via the bearings 7 and 8, and at the same time the spindle part 4 is restricted from moving toward the tension applying part 5.

A plurality of coupling pins 21 are formed on an end portion of the proximal-end pipe member 13, which faces the tension applying part 5. The coupling pins 21 are arranged at equal intervals in the circumferential direction of the proximal-end pipe member 13, such that their axes are parallel to the support shaft 6, and one end portion of each coupling pin 21 is fixed to the proximal-end pipe member 13. The other end portions of the coupling pins 21 are fitted in through holes 22 formed in the tension applying part 5, so as to be movable in the axial direction.

On the outer circumferential portion of the proximal-end pipe member 13, an outer circumferential flange 13b projecting outward in the radial direction, a circumferential surface 13c having a size in which the inner circumferential surface of the bobbin 3 fits, an annular groove 13d into which an O-ring 23 is inserted, and a small-diameter portion 13e are formed.

The outer circumferential flange 13b has an abutting surface 24 against which the end face of the bobbin 3 attached to the spindle part 4 abuts. Accordingly, the outer circumferential flange 13b regulates the movement of the bobbin 3 toward the tension applying part 5. A cylindrical wall 25 projecting toward the tension applying part 5 is integrated with the outer circumferential edge of the outer circumferential flange 13b. The cylindrical wall 25 is inserted into an annular groove 26 formed in the tension applying part 5, and forms a labyrinth seal 27 together with the annular groove 26.

When the bobbin 3 is attached to the spindle part 4, the O-ring 23 elastically deforms and comes in tight contact with the inner circumferential surface of the bobbin 3. The proximal end portion (an end portion close to the tension applying part 5) of the bobbin 3 is integrally rotatably supported by the proximal-end pipe member 13 (the spindle part 4) by the friction between this proximal end portion and the O-ring 23.

The small-diameter portion 13e of the proximal-end pipe member 13 is formed into a shape in which a cylindrical member 14 fits, and the proximal end portion of the cylindrical member 14 is fixed to the small-diameter portion 13e. As shown in FIG. 1, the cylindrical member 14 includes a cylindrical pipe 14a fixed to the proximal-end pipe member 13, and a ring 14b fixed to the distal end portion (an end portion on the side away from the tension applying part 5) of the pipe 14a. The outer diameters of the pipe 14a and ring 14b are formed to have sizes which can be inserted into the inner circumferential portion of the bobbin 3.

The ring 14b is fitted in a small-diameter portion 15a of the distal-end pipe member 15 (to be described below) so as to be movable in the axial direction. In this embodiment, the ring 14b forms "a fixed portion" of the present invention.

Figure 3:
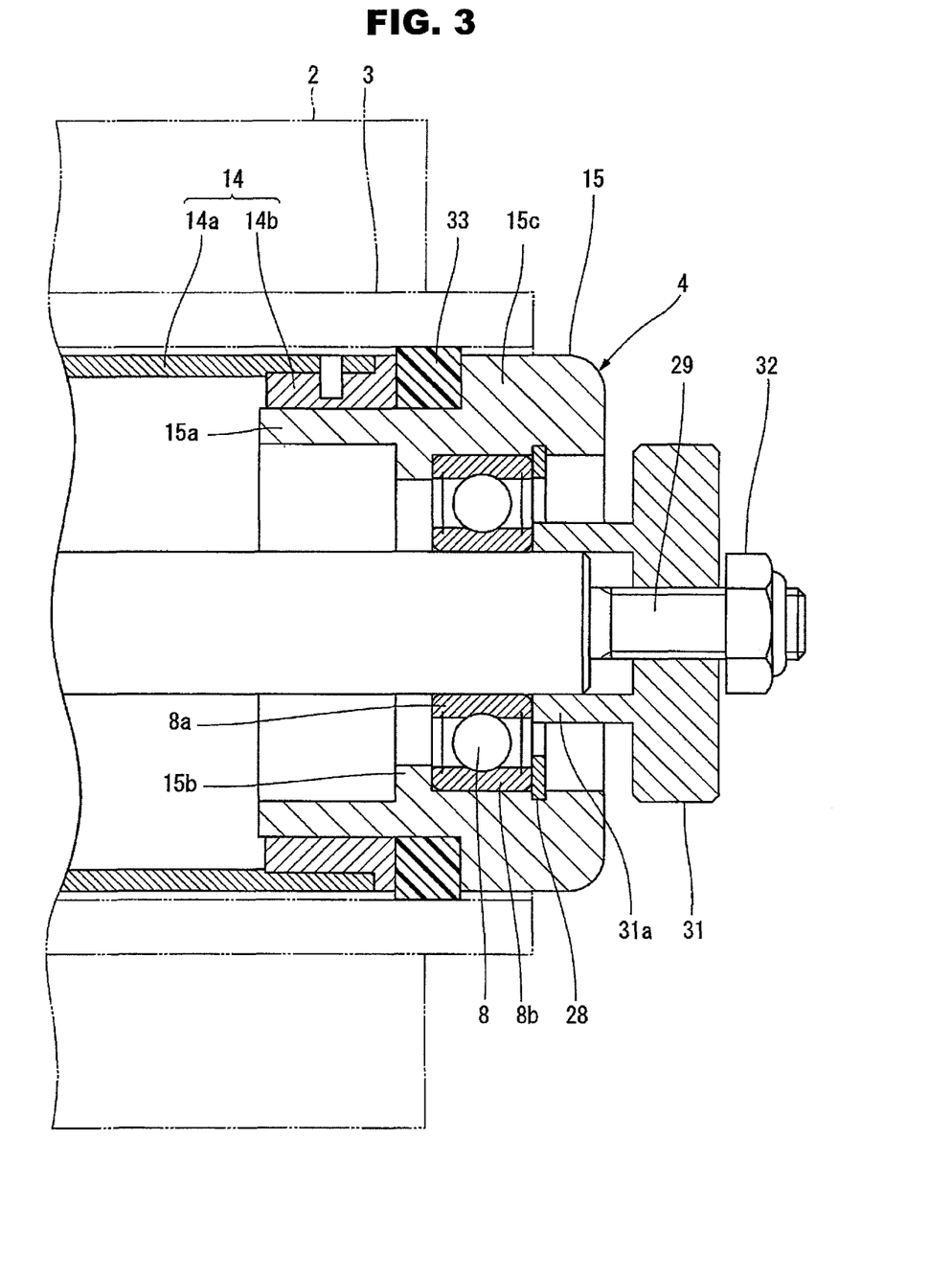
FIG. 3 is a sectional view showing, in an enlarged scale, the distal end portion of the thread-supplying spindle unit according to the embodiment of the present invention.

As shown in FIG. 3, the distal-end pipe member 15 is attached to an outer ring 8b of the distal-end bearing 8 so as to regulate the movement in the axial direction. The outer ring 8b of the distal-end bearing 8 is sandwiched between an inner circumferential flange 15b of the distal-end pipe member 15 and a circlip 28.

An inner ring 8a of the distal-end bearing 8 is fitted on the support shaft 6 so as to be movable in the axial direction. A male screw 29 is formed on the distal end portion of the support shaft 6, and a fastening nut 31 and stopper nut 32 are attached to the male screw 29. The fastening nut 31 has a cylindrical pusher 31a which pushes the inner ring 8a of the distal-end bearing 8 against the tension applying part 5, and is threadably engaged with the proximal end of the male screw 29 of the support shaft 6. When the fastening nut 31 is fastened to the male screw 29, the distal-end bearing 8 and distal-end pipe member 15 move toward the tension applying part 5. The stopper nut 32 prevents loosening of the fastening nut 31, and is threadably engaged with the distal end portion of the male screw 29.

The outer circumferential portion of the distal-end pipe member 15 includes the above-described small-diameter portion 15a positioned on the side of the tension applying part 5, and a large-diameter portion 15c. The outer diameter of the large-diameter portion 15c is formed to have a size which can be inserted into the inner circumferential portion of the bobbin 3.

The ring 14b of the cylindrical member 14 described above and an annular elastic member 33 are fitted on the small-diameter portion 15a of the distal-end pipe member 15. The elastic member 33 is sandwiched between the ring 14b and large-diameter portion 15c. The elastic member 33 according to this embodiment is formed by a urethane washer.

When the above-described fastening nut 31 is fastened and the distal-end pipe member 15 moves toward the tension applying part 5, the elastic member 33 is sandwiched between the ring 14b and the large-diameter portion 15c of the distal-end pipe member 15, and increases the outer diameter by elastic deformation. When the outer diameter of the elastic member 33 thus increases in a state in which the elastic member 33 is inserted into the bobbin 3, the outer circumferential portion of the elastic member 33 is pressed against the inner circumferential surface (core) of the bobbin 3.

The tension applying part 5 is formed by a hysteresis brake 34. The whole hysteresis brake 34 is formed into an annular shape, and one end portion in the axial direction is fixed to the stationary frame 11 by a fixing bolt 35 in a state in which the support shaft 6 extends through the hollow portion of the hysteresis brake 34. The hysteresis brake 34 is positioned on the same axis as that of the support shaft 6.

The hysteresis brake 34 includes a yoke 36 fixed to the stationary frame 11, and a hub 37 which rotates with respect to the yoke 36. The yoke 36 includes an annular excitation coil 38, and also includes an inside pole structure 39 and outside pole structure 40 (to be described below). An annular space 41 is formed between the inside and outside pole structures 39 and 40. The excitation coil 38 is accommodated in an insulated state in an annular groove 36a formed in the yoke 36. The annular groove 36a is open to the side away from the stationary frame 11.

The inside pole structure 39 is formed into an annular shape, and fixed by a fixing bolt 42 to an inner magnetic pole surface 36b pointing the side away from the stationary frame 11 on the inner circumferential side of the yoke 36. A plurality of recessed grooves 39a extending in the axial direction are formed in the inner circumferential portion of the inside pole structure 39. The recessed grooves 39a are arranged at equal intervals in the circumferential direction of the inside pole structure 39. In this embodiment, the inside pole structure 39 forms an inner circumferential magnetic pole of the present invention.

A boss portion 37a of the hub 37 is rotatably supported by the inner circumferential portions of the inside pole structure 39 and yoke 36 via bearings 43 and 44.

The outside pole structure 40 is formed by stacking a plurality of annular plates 40a in the axial direction. The outside pole structure 40 is fixed by a fixing bolt 45 which extends through all the plates 40a to an outer magnetic pole surface 36c pointing the side away from the stationary frame 11 on the outer circumferential side of the yoke 36. A plurality of recessed grooves 40b extending in the axial direction are formed in the inner circumferential portion of the outside pole structure 40. The recessed grooves 40b are arranged at equal intervals in the circumferential direction of the outside pole structure 40. Also, the recessed grooves 40b face projections 39b positioned between the recessed grooves 39a of the inside pole structure 39. In this embodiment, the outside pole structure 40 forms an outer circumferential magnetic pole of the present invention.

The hub 37 of the hysteresis brake 34 includes a cylindrical boss portion 37a supported by the yoke 36 and inside pole structure 39 via the bearings 43 and 44 described above, and a disk-like flange portion 37b extending outward in the radial direction from the boss portion 37a. The boss portion 37a is positioned between the support shaft 6 and the inner circumferential portions of the yoke 36 and inside pole structure 39. A gap d is formed between the boss portion 37a and the sleeve 16 on the side of the support shaft 6.

The flange portion 37b of the hub 37 is connected to an end portion on that side of the boss portion 37a, which is away from the stationary frame 11.

The flange portion 37b includes the through holes 22 in which the above-described coupling pins 21 fit, and the annular groove 26 forming the labyrinth seal 27 in cooperation with the cylindrical wall 25 on the side of the spindle part 4. The labyrinth seal 27 formed by the annular groove 26 and cylindrical wall 25 is positioned outside the coupling pins 21 in the radial direction. Therefore, a coupling portion between the spindle part 4 and the tension applying part 5 (the hysteresis brake 34) is sealed by the labyrinth seal 27 with respect to the space in which the thread 2 rotates.

A hysteresis member 46 is attached to the outer circumferential portion of the flange portion 37b by an attaching screw 47, and a cover 48 is attached to this outer circumferential portion by an attaching screw 49. The hysteresis member 46 is formed into a cylindrical shape by a ferromagnetic material, and inserted into the annular space 41 formed between the inside and outside pole structures 39 and 40. The cover 48 is formed into a cylindrical shape which covers the outer circumferential portions of the outside pole structure 40 and yoke 36 from their outside in the radial direction.

To attach the bobbin 3 to the spindle part 4 in the thread-supplying spindle unit 1 configured as described above, the distal end portion of the spindle part 4 is first inserted into the bobbin 3 in a state in which the fastening nut 31 is loosened. Then, the bobbin 3 is advanced toward the tension applying part 5, and the spindle part 4 is inserted into the bobbin 3. The bobbin 3 is advanced until the front end in the advancing direction abuts against the abutting surface 24 of the proximal-end pipe member 13. In this state in which the bobbin 3 is abutting against the abutting surface 24, the O-ring 23 of the proximal-end pipe member 13 is pressed against the inner circumferential surface of the bobbin 3, so the bobbin 3 is positioned on the same axis as that of the spindle part 4. After that, the fastening nut 31 is fastened. When the fastening nut 31 is fastened, the outer diameter of the elastic member 33 increases, so the elastic member 33 is pressed against the inner circumferential surface of the bobbin 3, and the other end portion of the bobbin 3 is fixed to the spindle part 4.

When the thread 2 is pulled by the loom in this attached state, the bobbin 3 and spindle part 4 rotate together. This rotation of the spindle part 4 is transmitted to the hub 37 of the hysteresis brake 34 via the coupling pins 21. If the excitation coil 38 of the hysteresis brake 34 is excited in this state, the hysteresis member 46 rotates with respect to the inside and outside pole structures 39 and 40, so the brake torque acts on the hub 37 (the spindle part 4 and bobbin 3). That is, tension is applied to the thread 2 pulled by the loom.

In the thread-supplying spindle unit 1 according to this embodiment, the spindle part 4 for supporting the bobbin 3 and the hysteresis brake 34 are arranged on the same axis. When compared to a case in which a gear is used to couple these members, therefore, the manufacturing cost can be reduced because the number of parts reduces.

If the bobbin 3 collides against the abutting surface 24 or another portion of the spindle part 4 when the bobbin 3 is attached to the spindle part 4 in the thread-supplying spindle unit 1, the impact load is transmitted from the spindle part 4 to the stationary frame 11 via the support shaft 6 (the proximal-end bearing 7 and sleeve 16). Although the hysteresis brake 34 and spindle part 4 are arranged on the same axis, therefore, the impact load is not directly applied to the hysteresis brake 34 when the bobbin is attached.

Accordingly, this embodiment can provide a thread-supplying spindle unit which simplifies the structure while preventing damage to the hysteresis brake 34, thereby reducing the manufacturing cost.

In this embodiment, coupling members for coupling the spindle part 4 and the tension applying part 5 (the hub 37) are the coupling pins 21 formed along the axial direction of the support shaft 6. One end portion of each coupling pin 21 is fixed to the spindle part 4, and the other end portion thereof is fitted in the hub 37 of the hysteresis brake 34 so as to be movable in the axial direction.

In this embodiment, the pins for coupling the spindle part 4 and the hub 37 of the hysteresis brake are formed to be movable in the axial direction. This makes it possible to reliably prevent the above-described impact load from being transmitted to the hub 37 via the coupling portion between the spindle part 4 and tension applying part 5. When this arrangement is adopted, therefore, the hysteresis brake 34 is more hardly damaged.

Note that one end of the coupling pin 21 is fixed to the spindle part 4 in this embodiment, but it is also possible to adopt an arrangement in which one end portion is fixed to the hub 37 of the hysteresis brake 34 and the other end portion is fitted in the spindle part 4 so as to be movable in the axial direction.

Note also that in this embodiment, the hub 37 of the hysteresis brake 34 includes the boss portion 37a rotatably supported by the inner circumferential portion of the yoke 36 via the bearings 43 and 44, and the flange portion 37b for supporting the hysteresis member 46. Accordingly, the cylindrical boss portion 37a of the hub for supporting the hysteresis member is rotatably supported not by the support shaft 6 but by the inner circumferential portion of the annular yoke 36 via the bearings 43 and 44.

Since the hysteresis member 46 is rotatably supported without using the support shaft 6, therefore, it is possible to reliably prevent the above-described impact load from being transmitted from the support shaft 6 to the hysteresis brake 34. Accordingly, this embodiment can provide a thread-supplying spindle unit in which the operation of the hysteresis brake 34 is highly reliable because the hysteresis brake 34 receives no impact when the bobbin is attached.

Furthermore, when adopting the arrangement in which the spindle part 4 for supporting the bobbin 3 and the hysteresis brake 34 are arranged on the same axis, the spindle part 4 and hysteresis brake 34 are close to each other, so fine thread dust generated when the special thread is pulled out from the bobbin 3 may enter the hysteresis brake 34. If this thread dust enters the annular space of the yoke 36 or the bearing for rotatably supporting the rotating shaft, the hysteresis brake 34 may break down.

Accordingly, the labyrinth seal 27 including the cylindrical wall 25 extending toward the hub 37 from the spindle part 4 and the annular groove 26 which is formed in the hub 37 and into which the cylindrical wall 25 is inserted is formed in the coupling portion between the spindle part 4 and the tension applying part 5 (the hub 37) according to this embodiment.

In this embodiment, therefore, the labyrinth seal 27 can prevent thread dust (not shown) generated when the thread 2 is pulled out from the bobbin 3 from entering the hysteresis brake 34.

Note that the annular groove 26 is formed in the hub 37 in this embodiment, but the labyrinth seal may also be formed by forming an annular groove in the proximal-end pipe member 13 of the spindle part 4, and inserting one end of a cylindrical wall formed on the hub 37 into this groove.

In the conventional spindle unit, an O-ring is interposed between a bobbin and a rotating shaft for attaching the bobbin, and the bobbin is fixed to the bobbin-attaching rotating shaft. In the conventional spindle unit having this fixing structure, however, vibrations may occur when supplying a thread for the following reason. That is, since the inner diameter of the bobbin largely varies, if the inner diameter of the bobbin is larger than the outer diameter of the O-ring attached to the rotating shaft, a fixing force obtained by the O-ring relatively decreases, and it is no longer possible to hold the bobbin on the same axis as that of the rotating shaft.

Accordingly, to provide a thread-supplying spindle unit in which no vibrations occur when supplying a thread although a bobbin can easily be attached, the spindle part 4 according to this embodiment includes the ring 14b which functions as a fixed portion which is restricted from moving in the axial direction with respect to the support shaft 6, the distal end pipe member 15 which functions as a movable portion capable of moving in the axial direction with respect to the support shaft 6, and the annular elastic member 33 sandwiched between them. In addition, as a mechanism for adjusting the spacing between the ring 14b and distal-end pipe member 15, the spindle part 4 includes the distal-end bearing 8, male screw 29, fastening nut 31, and the like in the distal end portion positioned on the side away from the hysteresis brake 34. Since, therefore, the distal-end bearing 8 and distal-end pipe member 15 move close to the ring 14b when the fastening nut 31 is fastened to the male screw 29, the elastic member 33 increases the outer diameter by elastic deformation and is pressed against the core of the bobbin 3.

In this embodiment, therefore, the bobbin 3 is strongly fixed to the spindle part 4 by the elastic member 33 without being influenced by the variation in inner diameter of the bobbin 3. This makes it possible to provide a thread-supplying spindle unit in which no vibrations occur when supplying a thread although the bobbin 3 can easily be attached.

EXPLANATION OF THE REFERENCE NUMERALS AND SIGNS

1 . . . thread-supplying spindle unit, 2 . . . thread, 3 . . . bobbin, 4 . . . spindle part, 5 . . . tension applying part, 6 . . . support shaft, 6a . . . support portion, 11 . . . stationary frame, 14b . . . ring (fixed portion), 15 . . . distal-end pipe member (movable portion), 21 . . . coupling pin (pin), 22 . . . through hole, 25 . . . cylindrical wall, 26 . . . annular groove, 27 . . . labyrinth seal, 33 . . . elastic member, 34 . . . hysteresis brake, 36 . . . yoke, 37 . . . hub, 37a . . . boss portion, 37b . . . flange portion, 38 . . . excitation coil, 39 . . . inside pole structure (inner circumferential magnetic pole), 40 . . . outside pole structure (outer circumferential magnetic pole), 41 . . . annular space, 46 . . . hysteresis member.

The invention claimed is:

1. A spindle unit comprising:
   a support shaft having one end portion fixed to a stationary frame;
   a hysteresis brake including an annular yoke which has a central hole through which said support shaft extends, the annular yoke being fixed to said stationary frame at one end, and including an inner circumferential magnetic pole and an outer circumferential magnetic pole facing each other with an annular space being interposed therebetween in the other end, and an excitation coil built-in, a cylindrical hysteresis member through which said support shaft extends and which has one end portion inserted into the space of the other end of said yoke, and an annular hub through which said support shaft extends and which rotatably supports said hysteresis member around said support shaft as a rotation center;
   a spindle part rotatably supported by said support shaft as a rotation center in a portion of said support shaft which is closer to the other end portion than said hysteresis brake, said spindle part being restricted from moving toward said hysteresis brake;
   a coupling member configured to couple said hub and said spindle part with each other; and
   a regulating member configured to regulate the movement of said spindle part toward said hysteresis brake;
   wherein said coupling member includes a pin formed along an axial direction of said support shaft, the pin having one end portion fixed to one of said spindle part and said hub, and the other end portion configured to fit in the other one of said spindle part and said hub, herein the other end portion is movable in the axial direction.

2. The spindle unit according to claim 1, wherein
   said spindle unit includes a bearing attached to said support shaft, a pipe member attached to said bearing, and a cylindrical member supported by said pipe member, wherein said support shaft extends through the cylindrical member,
   said regulating member includes a sleeve provided between said stationary frame and said bearing, wherein said support shaft extends through the sleeve.

3. The spindle unit according to claim 1, wherein said spindle part includes:
   a fixed portion being restricted from moving in an axial direction with respect to said support shaft;
   a movable portion movable in the axial direction with respect to said support shaft;
   an annular elastic member sandwiched between said fixed portion and said movable portion; and
   a mechanism configured to adjust a spacing between said fixed portion and said movable portion.

4. A spindle unit comprising:
   a support shaft having one end portion fixed to a stationary frame;
   a hysteresis brake including an annular yoke which has a central hole through which said support shaft extends, the annular yoke being fixed to said stationary frame at one end, and including an inner circumferential magnetic pole and an outer circumferential magnetic pole facing each other with an annular space being interposed therebetween in the other end, and an excitation coil built-in, a cylindrical hysteresis member through which said support shaft extends and which has one end portion inserted into the space of the other end of said yoke, and an annular hub through which said support shaft extends and which rotatably supports said hysteresis member around said support shaft as a rotation center;
   a spindle part rotatably supported by said support shaft as a rotation center in a portion of said support shaft which is closer to the other end portion than said hysteresis brake, said spindle part being restricted from moving toward said hysteresis brake;
   a coupling member configured to couple said hub and said spindle part with each other; and
   a regulating member configured to regulate the movement of said spindle part toward said hysteresis brake, further comprising a bearing formed on an inner circumferential portion of said yoke, and
   said hub includes:
   a cylindrical boss portion arranged between the inner circumferential portion of said yoke and said support shaft, said cylindrical boss portion being rotatably supported by said support shaft as a rotation center via said bearing; and
   a disk-like flange portion extending outward in a radial direction from said boss portion, and configured to support said hysteresis member at an outer circumferential portion of the disk-like flange portion.

5. A spindle unit comprising:
   a support shaft having one end portion fixed to a stationary frame;
   a hysteresis brake including an annular yoke which has a central hole through which said support shaft extends, the annular yoke being fixed to said stationary frame at one end, and including an inner circumferential magnetic pole and an outer circumferential magnetic pole facing each other with an annular space being interposed therebetween in the other end, and an excitation coil built-in, a cylindrical hysteresis member through which said support shaft extends and which has one end portion inserted into the space of the other end of said yoke, and an annular hub through which said support shaft extends and which rotatably supports said hysteresis member around said support shaft as a rotation center;
   a spindle part rotatably supported by said support shaft as a rotation center in a portion of said support shaft which is closer to the other end portion than said hysteresis brake, said spindle part being restricted from moving toward said hysteresis brake;

a coupling member configured to couple said hub and said spindle part with each other; and a regulating member configured to regulate the movement of said spindle part toward said hysteresis brake, further comprising a labyrinth seal including an annular groove formed in one of said spindle part and said hub, and a cylindrical wall member formed on the other one of said spindle part and said hub and having one end inserted into said groove.

\* \* \* \* \*